(12) United States Patent
Schultz et al.

(10) Patent No.: US 11,484,798 B2
(45) Date of Patent: *Nov. 1, 2022

(54) EVENT-BASED CURRENCY

(71) Applicant: Kabam, Inc., San Francisco, CA (US)

(72) Inventors: Stephanie K. Schultz, San Francisco, CA (US); Michael C. Caldarone, San Francisco, CA (US)

(73) Assignee: Kabam, Inc., San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/932,529

(22) Filed: Jul. 17, 2020

(65) Prior Publication Data
US 2020/0349812 A1    Nov. 5, 2020

Related U.S. Application Data

(63) Continuation of application No. 16/426,934, filed on May 30, 2019, now Pat. No. 10,741,022, which is a
(Continued)

(51) Int. Cl.
*A63F 13/69*    (2014.01)
*G07F 17/32*    (2006.01)

(52) U.S. Cl.
CPC .......... *A63F 13/69* (2014.09); *G07F 17/3227* (2013.01); *G07F 17/3244* (2013.01);
(Continued)

(58) Field of Classification Search
None
See application file for complete search history.

(56) References Cited

U.S. PATENT DOCUMENTS

| 5,816,918 A | 10/1998 | Kelly |
| 5,933,813 A | 8/1999 | Teicher |

(Continued)

FOREIGN PATENT DOCUMENTS

| KR | 1020130137431 | 12/2013 |
| WO | 2002026333 | 1/2002 |

(Continued)

OTHER PUBLICATIONS

'Quest item—WoWWiki—Your guide to the World of Warcraft', printed from http://www.wowwiki.com/Quest_Item, Retrieved on Apr. 16, 2014, 1 page.
(Continued)

*Primary Examiner* — Jason T Yen
(74) *Attorney, Agent, or Firm* — Esplin & Associates, PC

(57) ABSTRACT

An approach to facilitating event-based currency is provided. A first virtual currency usable by users of a game space to purchase in-space benefits may be managed. An event in the game space that is conducted during an event time period may be managed such that, during the event time period, an event virtual currency may be distributed to one or more of the users as a reward for certain operations and/or achievements performed in the game space during the event time period. Exchanges of in-space benefits associated with the event virtual currency may be effectuated for one or more of the users. In some implementations, the event virtual currency may not available to the users after the event time period, while the first virtual currency may be available to the users during and after the event time period.

12 Claims, 3 Drawing Sheets

Related U.S. Application Data continuation of application No. 15/981,361, filed on May 16, 2018, now Pat. No. 10,319,187, which is a continuation of application No. 15/462,632, filed on Mar. 17, 2017, now Pat. No. 9,978,211, which is a continuation of application No. 13/865,432, filed on Apr. 18, 2013, now Pat. No. 9,626,475.

(52) U.S. Cl.
CPC ... *A63F 2300/575* (2013.01); *A63F 2300/609* (2013.01); *A63F 2300/65* (2013.01); *A63F 2300/807* (2013.01); *A63F 2300/8094* (2013.01); *G07F 17/326* (2013.01); *G07F 17/3255* (2013.01); *G07F 17/3262* (2013.01); *G07F 17/3267* (2013.01)

(56) References Cited

U.S. PATENT DOCUMENTS

| | | |
|---|---|---|
| 5,964,660 A | 10/1999 | James |
| 6,142,472 A | 11/2000 | Kliebisch |
| 6,190,225 B1 | 2/2001 | Coleman |
| 6,402,619 B1 | 6/2002 | Sato |
| 6,561,904 B2 | 5/2003 | Locke |
| 6,604,008 B2 | 8/2003 | Chudley |
| 6,745,236 B1 | 6/2004 | Hawkins |
| 6,811,483 B1 | 11/2004 | Webb |
| 6,850,900 B1 | 2/2005 | Hare |
| 6,928,474 B2 | 8/2005 | Venkatesan |
| 7,050,868 B1 | 5/2006 | Graepel |
| 7,076,453 B2 | 7/2006 | Jammes |
| 7,156,733 B2 | 1/2007 | Chiang |
| 7,192,352 B2 | 3/2007 | Walker |
| 7,197,352 B2 | 3/2007 | Gott |
| 7,326,115 B2 | 2/2008 | Baerlocher |
| 7,381,133 B2 | 6/2008 | Thomas |
| 7,533,336 B2 | 5/2009 | Jaffe |
| 7,660,740 B2 | 2/2010 | Boone |
| 7,682,239 B2 | 3/2010 | Friedman |
| 7,698,229 B2 | 4/2010 | Hsu |
| 7,785,188 B2 | 8/2010 | Cannon |
| 7,813,821 B1 | 10/2010 | Howell |
| 7,819,749 B1 | 10/2010 | Fish |
| 7,945,802 B2 | 5/2011 | Hamilton, II |
| 7,959,507 B2 | 6/2011 | Cannon |
| 8,010,404 B1 | 8/2011 | Wu |
| 8,016,668 B2 | 9/2011 | Hardy |
| 8,047,909 B2 | 11/2011 | Walker |
| 8,057,294 B2 | 11/2011 | Pacey |
| 8,066,571 B2 | 11/2011 | Koster |
| 8,105,156 B2 | 1/2012 | Walker |
| 8,147,340 B2 | 4/2012 | BrunetdeCourssou |
| 8,157,635 B2 | 4/2012 | Hardy |
| 8,187,101 B2 | 5/2012 | Herrmann |
| 8,226,472 B2 | 7/2012 | Van Luchene |
| 8,231,453 B2 | 7/2012 | Wolf |
| 8,231,470 B2 | 7/2012 | Feeney |
| 8,239,487 B1 | 8/2012 | Hoffman |
| 8,246,439 B2 | 8/2012 | Kelly |
| 8,272,934 B2 | 9/2012 | Olive |
| 8,272,951 B2 | 9/2012 | Ganz |
| 8,272,956 B2 | 9/2012 | Kelly |
| 8,282,491 B2 | 10/2012 | Auterio |
| 8,287,367 B2 | 10/2012 | Hall |
| 8,287,383 B1 | 10/2012 | Etter |
| 8,287,384 B2 | 10/2012 | Auterio |
| 8,292,743 B1 | 10/2012 | Etter |
| 8,313,372 B2 | 11/2012 | Naicker |
| 8,317,584 B2 | 11/2012 | Aoki |
| 8,317,601 B1 * | 11/2012 | Luciano, Jr. ........ G07F 17/3248 463/25 |
| 8,323,110 B2 | 12/2012 | Shibamiya |
| 8,328,642 B2 | 12/2012 | Mosites |
| 8,332,260 B1 | 12/2012 | Mysen |
| 8,332,544 B1 | 12/2012 | Ralls |
| 8,348,716 B2 | 1/2013 | Ganz |
| 8,348,762 B2 | 1/2013 | Willis |
| 8,348,767 B2 | 1/2013 | Mahajan |
| 8,348,768 B2 | 1/2013 | Auterio |
| 8,360,858 B2 | 1/2013 | LaRocca |
| 8,360,866 B2 | 1/2013 | VanLuchene |
| 8,360,867 B2 | 1/2013 | VanLuchene |
| 8,360,868 B2 | 1/2013 | Shvili |
| 8,366,544 B2 | 2/2013 | Walker |
| 8,366,550 B2 | 2/2013 | Herrmann |
| 8,371,925 B2 | 2/2013 | Bonney |
| 8,376,826 B2 | 2/2013 | Katz |
| 8,382,572 B2 | 2/2013 | Hoffman |
| 8,388,427 B2 | 3/2013 | Yariv |
| 8,401,913 B2 | 3/2013 | Alivandi |
| 8,408,989 B2 | 4/2013 | Bennett |
| 8,439,759 B1 | 5/2013 | Mello |
| 8,475,262 B2 | 7/2013 | Wolf |
| 8,506,394 B2 | 8/2013 | Kelly |
| 8,512,150 B2 | 8/2013 | Herrmann |
| 8,533,076 B2 | 9/2013 | Chu |
| 8,583,266 B2 | 11/2013 | Herbrich |
| 8,636,591 B1 | 1/2014 | Hawk |
| 8,758,119 B1 | 6/2014 | BronsteinBendayan |
| 8,777,754 B1 | 7/2014 | Santini |
| 8,784,214 B2 | 7/2014 | Parks |
| 8,790,185 B1 | 7/2014 | Caldarone |
| 8,821,260 B1 | 9/2014 | DeSanti |
| 8,831,758 B1 | 9/2014 | Chu |
| 8,843,557 B2 | 9/2014 | Ranade |
| 8,851,978 B1 | 10/2014 | Koh |
| 8,920,243 B1 | 12/2014 | Curtis |
| 8,961,319 B1 | 2/2015 | Pieron |
| 8,968,067 B1 | 3/2015 | Curtis |
| 9,007,189 B1 | 4/2015 | Curtis |
| 9,138,639 B1 | 9/2015 | Ernst |
| 9,256,887 B2 | 2/2016 | Santini |
| 9,257,007 B2 | 2/2016 | Santini |
| 9,259,642 B1 | 2/2016 | McNeill |
| 9,286,510 B2 | 3/2016 | Soohoo |
| 9,317,993 B2 | 4/2016 | Hardy |
| 9,375,636 B1 | 6/2016 | Wakeford |
| 9,403,093 B2 | 8/2016 | Harrington |
| 9,406,201 B2 | 8/2016 | Englman |
| 9,452,356 B1 | 9/2016 | Tsao |
| 9,452,364 B1 | 9/2016 | Curtis |
| 9,463,376 B1 | 10/2016 | Kim |
| 9,468,851 B1 | 10/2016 | Pieron |
| 9,610,503 B2 | 4/2017 | Pieron |
| 9,616,331 B1 | 4/2017 | Jordan |
| 9,626,475 B1 | 4/2017 | Schultz |
| 9,656,174 B1 | 5/2017 | McLellan |
| 9,669,313 B2 | 6/2017 | Pieron |
| 9,669,315 B1 | 6/2017 | Curtis |
| 9,682,314 B2 | 6/2017 | Kim |
| 9,773,254 B1 | 9/2017 | Schultz |
| 9,776,089 B1 | 10/2017 | Curtis |
| 9,782,677 B1 | 10/2017 | Topkins |
| 9,782,679 B1 | 10/2017 | Chu |
| 9,789,407 B1 | 10/2017 | Pieron |
| 9,795,885 B1 | 10/2017 | Kim |
| 9,975,050 B1 | 5/2018 | Pieron |
| 9,978,211 B1 | 5/2018 | Schultz |
| 10,068,431 B1 | 9/2018 | Howell |
| 10,307,101 B1 | 6/2019 | Miller |
| 10,350,501 B2 | 7/2019 | Pieron |
| 10,357,719 B2 | 7/2019 | Pieron |
| 10,463,968 B1 | 11/2019 | Patenge |
| 10,565,606 B2 | 2/2020 | Schultz |
| 10,741,022 B2 | 8/2020 | Schultz |
| 2002/0023039 A1 | 2/2002 | Fritsch |
| 2002/0059397 A1 | 5/2002 | Feola |
| 2002/0072412 A1 | 6/2002 | Young |
| 2002/0094863 A1 | 7/2002 | Klayh |
| 2002/0095327 A1 | 7/2002 | Zumel |
| 2002/0115488 A1 | 8/2002 | Berry |
| 2002/0119824 A1 | 8/2002 | Allen |
| 2002/0165794 A1 | 11/2002 | Ishihara |

(56) References Cited

U.S. PATENT DOCUMENTS

| | | |
|---|---|---|
| 2002/0183105 A1 | 12/2002 | Cannon |
| 2002/0193162 A1 | 12/2002 | Walker |
| 2003/0003983 A1* | 1/2003 | Walker ............... G07F 17/3269 463/16 |
| 2003/0008713 A1 | 1/2003 | Ushiro |
| 2003/0027619 A1 | 2/2003 | Nicastro |
| 2003/0032476 A1 | 2/2003 | Walker |
| 2003/0102625 A1 | 6/2003 | Katz |
| 2003/0109301 A1 | 6/2003 | Chudley |
| 2003/0157978 A1 | 8/2003 | Englman |
| 2003/0174178 A1 | 9/2003 | Hodges |
| 2003/0190960 A1 | 10/2003 | Jokipii |
| 2003/0216167 A1 | 11/2003 | Gauselmann |
| 2004/0002387 A1 | 1/2004 | Grady |
| 2004/0068451 A1 | 4/2004 | Lenk |
| 2004/0143852 A1 | 7/2004 | Meyers |
| 2004/0199471 A1 | 10/2004 | Hardjono |
| 2004/0215524 A1 | 10/2004 | Parkyn |
| 2004/0224745 A1 | 11/2004 | Bregenzer |
| 2004/0225387 A1 | 11/2004 | Smith |
| 2004/0267611 A1 | 12/2004 | Hoerenz |
| 2005/0096117 A1 | 5/2005 | Katz |
| 2005/0114223 A1 | 5/2005 | Schneider |
| 2005/0165686 A1 | 7/2005 | Zack |
| 2005/0192087 A1 | 9/2005 | Friedman |
| 2005/0209008 A1 | 9/2005 | Shimizu |
| 2005/0227751 A1 | 10/2005 | Zanelli |
| 2005/0255914 A1 | 11/2005 | McHale |
| 2005/0277474 A1 | 12/2005 | Barry |
| 2006/0030407 A1 | 2/2006 | Thayer |
| 2006/0058103 A1 | 3/2006 | Danieli |
| 2006/0063587 A1 | 3/2006 | Manzo |
| 2006/0079317 A1* | 4/2006 | Flemming ........... G07F 17/3244 463/25 |
| 2006/0100006 A1 | 5/2006 | Mitchell |
| 2006/0116196 A1 | 6/2006 | Vancura |
| 2006/0155597 A1 | 7/2006 | Gleason |
| 2006/0200370 A1 | 9/2006 | Ratliff |
| 2006/0205461 A1 | 9/2006 | LaRocca |
| 2006/0217198 A1 | 9/2006 | Johnson |
| 2006/0287029 A1 | 12/2006 | Yoshinobu |
| 2006/0287102 A1 | 12/2006 | White |
| 2007/0021213 A1 | 1/2007 | Foe |
| 2007/0060297 A1* | 3/2007 | Hein ...................... G07F 17/32 463/20 |
| 2007/0077988 A1 | 4/2007 | Friedman |
| 2007/0105615 A1 | 5/2007 | Lind |
| 2007/0111770 A1 | 5/2007 | Van Luchene |
| 2007/0129139 A1 | 6/2007 | Nguyen |
| 2007/0129147 A1 | 6/2007 | Gagner |
| 2007/0155485 A1 | 7/2007 | Cuddy |
| 2007/0191101 A1 | 8/2007 | Coliz |
| 2007/0191102 A1 | 8/2007 | Coliz |
| 2007/0213116 A1 | 9/2007 | Crawford |
| 2007/0233585 A1 | 10/2007 | Ben Simon |
| 2007/0281285 A1 | 12/2007 | Jayaweera |
| 2008/0004093 A1 | 1/2008 | Van Luchene |
| 2008/0032787 A1 | 2/2008 | Low |
| 2008/0058092 A1 | 3/2008 | Schwartz |
| 2008/0076527 A1 | 3/2008 | Low |
| 2008/0113706 A1 | 5/2008 | OHalloran |
| 2008/0113815 A1 | 5/2008 | Weingardt |
| 2008/0124353 A1 | 5/2008 | Brodeur |
| 2008/0154798 A1 | 6/2008 | Valz |
| 2008/0171599 A1 | 7/2008 | Salo |
| 2008/0194318 A1 | 8/2008 | Kralicky |
| 2008/0200260 A1 | 8/2008 | Deng |
| 2008/0207306 A1 | 8/2008 | Higbie |
| 2008/0214295 A1 | 9/2008 | Dabrowski |
| 2008/0227525 A1 | 9/2008 | Kelly |
| 2008/0234043 A1 | 9/2008 | McCaskey |
| 2008/0248867 A1 | 10/2008 | Englman |
| 2008/0268946 A1 | 10/2008 | Roemer |
| 2008/0275786 A1 | 11/2008 | Gluck |
| 2008/0300045 A1 | 12/2008 | Ratcliff |
| 2008/0318668 A1 | 12/2008 | Ching |
| 2009/0011812 A1 | 1/2009 | Katz |
| 2009/0017886 A1 | 1/2009 | McGucken |
| 2009/0036199 A1 | 2/2009 | Myus |
| 2009/0048918 A1 | 2/2009 | Dawson |
| 2009/0061982 A1 | 3/2009 | Brito |
| 2009/0082099 A1 | 3/2009 | Luciano |
| 2009/0124353 A1 | 5/2009 | Collette |
| 2009/0204907 A1 | 8/2009 | Finn |
| 2009/0208181 A1 | 8/2009 | Cottrell |
| 2009/0210301 A1 | 8/2009 | Porter |
| 2009/0234710 A1 | 9/2009 | Belgaied Hassine |
| 2009/0280905 A1 | 11/2009 | Weisman |
| 2009/0315893 A1 | 12/2009 | Smith |
| 2010/0022307 A1 | 1/2010 | Steuer |
| 2010/0035689 A1 | 2/2010 | Altshuler |
| 2010/0041472 A1 | 2/2010 | Gagner |
| 2010/0050088 A1 | 2/2010 | Neustaedter |
| 2010/0070056 A1 | 3/2010 | Coronel |
| 2010/0094841 A1 | 4/2010 | Bardwil |
| 2010/0099471 A1 | 4/2010 | Feeney |
| 2010/0107214 A1 | 4/2010 | Ganz |
| 2010/0113162 A1 | 5/2010 | Vemuri |
| 2010/0120525 A1 | 5/2010 | Baerlocher |
| 2010/0174593 A1 | 7/2010 | Cao |
| 2010/0198653 A1 | 8/2010 | Bromenshenkel |
| 2010/0210356 A1 | 8/2010 | Losica |
| 2010/0227675 A1 | 9/2010 | Luxton |
| 2010/0227682 A1 | 9/2010 | Reville |
| 2010/0228606 A1 | 9/2010 | Walker |
| 2010/0240444 A1 | 9/2010 | Friedman |
| 2010/0241491 A1 | 9/2010 | Eglen |
| 2010/0241492 A1 | 9/2010 | Eglen |
| 2010/0306015 A1 | 12/2010 | Kingston |
| 2011/0045898 A1 | 2/2011 | Anderson |
| 2011/0065511 A1 | 3/2011 | Mahan |
| 2011/0092271 A1* | 4/2011 | Nguyen ............... G07F 17/3211 463/25 |
| 2011/0092273 A1 | 4/2011 | Cerbini |
| 2011/0111841 A1 | 5/2011 | Tessmer |
| 2011/0112662 A1 | 5/2011 | Thompson |
| 2011/0113353 A1 | 5/2011 | Koh |
| 2011/0118002 A1 | 5/2011 | Aoki |
| 2011/0145040 A1 | 6/2011 | Zahn |
| 2011/0151957 A1 | 6/2011 | Falciglia |
| 2011/0212756 A1 | 9/2011 | Packard |
| 2011/0218033 A1 | 9/2011 | Englman |
| 2011/0227919 A1 | 9/2011 | Bongio |
| 2011/0250954 A1 | 10/2011 | Braund |
| 2011/0256936 A1 | 10/2011 | Walker |
| 2011/0263324 A1 | 10/2011 | Ganetakos |
| 2011/0275438 A9* | 11/2011 | Hardy .................. G07F 17/329 463/42 |
| 2011/0281638 A1 | 11/2011 | Bansi |
| 2011/0281654 A1 | 11/2011 | Kelly |
| 2011/0282764 A1 | 11/2011 | Borst |
| 2011/0300923 A1 | 12/2011 | VanLuchene |
| 2011/0319152 A1 | 12/2011 | Ross |
| 2011/0319170 A1 | 12/2011 | Shimura |
| 2012/0011002 A1 | 1/2012 | Crowe |
| 2012/0015714 A1* | 1/2012 | Ocko ..................... G06Q 10/10 463/25 |
| 2012/0015715 A1* | 1/2012 | Luxton ............... G07F 17/3281 463/25 |
| 2012/0034961 A1 | 2/2012 | Berman |
| 2012/0040743 A1 | 2/2012 | Auterio |
| 2012/0040761 A1 | 2/2012 | Auterio |
| 2012/0042282 A1 | 2/2012 | Wong |
| 2012/0046111 A1 | 2/2012 | Walker |
| 2012/0047002 A1 | 2/2012 | Patel |
| 2012/0059730 A1 | 3/2012 | Jensen |
| 2012/0083909 A1 | 4/2012 | Carpenter |
| 2012/0101886 A1 | 4/2012 | Subramanian |
| 2012/0108306 A1 | 5/2012 | Munsell |
| 2012/0109785 A1 | 5/2012 | Karlsson |
| 2012/0115593 A1 | 5/2012 | Vann |
| 2012/0122589 A1 | 5/2012 | Kelly |
| 2012/0129590 A1 | 5/2012 | Morrisroe |
| 2012/0130856 A1 | 5/2012 | Petri |

(56) References Cited

U.S. PATENT DOCUMENTS

| | | |
|---|---|---|
| 2012/0142429 A1 | 6/2012 | Muller |
| 2012/0156668 A1 | 6/2012 | Zelin |
| 2012/0157187 A1 | 6/2012 | Moshal |
| 2012/0157193 A1 | 6/2012 | Arezina |
| 2012/0166380 A1 | 6/2012 | Sridharan |
| 2012/0166449 A1 | 6/2012 | Pitaliya |
| 2012/0178514 A1 | 7/2012 | Schulzke |
| 2012/0178515 A1 | 7/2012 | Adams |
| 2012/0178529 A1 | 7/2012 | Collard |
| 2012/0197874 A1 | 8/2012 | Zatkin |
| 2012/0202570 A1 | 8/2012 | Schwartz |
| 2012/0202589 A1 | 8/2012 | Kelly |
| 2012/0203669 A1 | 8/2012 | Borsch |
| 2012/0215667 A1 | 8/2012 | Ganz |
| 2012/0221430 A1 | 8/2012 | Naghmouchi |
| 2012/0226573 A1 | 9/2012 | Zakas |
| 2012/0231891 A1 | 9/2012 | Watkins |
| 2012/0244945 A1 | 9/2012 | Kolo |
| 2012/0244947 A1 | 9/2012 | Ehrlich |
| 2012/0244950 A1* | 9/2012 | Braun .............. A63F 13/85 463/42 |
| 2012/0245988 A1 | 9/2012 | Pace |
| 2012/0256377 A1 | 10/2012 | Schneider |
| 2012/0265604 A1 | 10/2012 | Corner |
| 2012/0282986 A1 | 11/2012 | Castro |
| 2012/0289315 A1 | 11/2012 | Van Luchene |
| 2012/0289330 A1 | 11/2012 | Leydon |
| 2012/0289346 A1 | 11/2012 | VanLuchene |
| 2012/0295699 A1 | 11/2012 | Reiche |
| 2012/0296716 A1 | 11/2012 | Barbeau |
| 2012/0302329 A1 | 11/2012 | Katz |
| 2012/0302335 A1 | 11/2012 | Gregory-Brown |
| 2012/0309504 A1 | 12/2012 | Isozaki |
| 2012/0311504 A1 | 12/2012 | van Os |
| 2012/0322545 A1 | 12/2012 | Arnone |
| 2012/0322561 A1 | 12/2012 | Kohlhoff |
| 2012/0329549 A1 | 12/2012 | Johnson |
| 2012/0330785 A1* | 12/2012 | Hamick .............. G06Q 30/06 705/26.41 |
| 2013/0005437 A1 | 1/2013 | Bethke |
| 2013/0005466 A1 | 1/2013 | Mahajan |
| 2013/0005473 A1 | 1/2013 | Bethke |
| 2013/0005480 A1 | 1/2013 | Bethke |
| 2013/0006735 A1 | 1/2013 | Koenigsberg |
| 2013/0006736 A1 | 1/2013 | Bethke |
| 2013/0012304 A1 | 1/2013 | Cartwright |
| 2013/0013094 A1 | 1/2013 | Parks |
| 2013/0013326 A1 | 1/2013 | Miller |
| 2013/0013459 A1 | 1/2013 | Kerr |
| 2013/0029745 A1 | 1/2013 | Kelly |
| 2013/0036064 A1 | 2/2013 | Osvald |
| 2013/0072278 A1 | 3/2013 | Salazar |
| 2013/0079087 A1 | 3/2013 | Brosnan |
| 2013/0090173 A1 | 4/2013 | Kislyi |
| 2013/0090750 A1 | 4/2013 | Herrman |
| 2013/0095914 A1 | 4/2013 | Allen |
| 2013/0123005 A1 | 5/2013 | Allen |
| 2013/0124361 A1 | 5/2013 | Bryson |
| 2013/0151342 A1 | 6/2013 | Citron |
| 2013/0173393 A1 | 7/2013 | Calman |
| 2013/0178259 A1 | 7/2013 | Strause |
| 2013/0184075 A1 | 7/2013 | Kim |
| 2013/0210511 A1 | 8/2013 | LaRocca |
| 2013/0217453 A1 | 8/2013 | Briggs |
| 2013/0217489 A1 | 8/2013 | Bronstein Bendayan |
| 2013/0226733 A1 | 8/2013 | Evans |
| 2013/0237299 A1 | 9/2013 | Bancel |
| 2013/0244767 A1 | 9/2013 | Barclay |
| 2013/0260850 A1* | 10/2013 | Carpe .............. A63F 13/79 463/9 |
| 2013/0288757 A1 | 10/2013 | Guthridge |
| 2013/0288787 A1 | 10/2013 | Yoshie |
| 2013/0290147 A1 | 10/2013 | Chandra |
| 2013/0303276 A1 | 11/2013 | Weston |
| 2013/0310164 A1 | 11/2013 | Walker |
| 2013/0324259 A1 | 12/2013 | McCaffrey |
| 2013/0339111 A1 | 12/2013 | Ross |
| 2013/0339228 A1 | 12/2013 | Shuster |
| 2013/0344932 A1* | 12/2013 | Adams .............. G07F 17/34 463/17 |
| 2014/0004884 A1 | 1/2014 | Chang |
| 2014/0011565 A1 | 1/2014 | Elias |
| 2014/0018156 A1 | 1/2014 | Rizzotti |
| 2014/0033262 A1 | 1/2014 | Anders |
| 2014/0038679 A1 | 2/2014 | Snow |
| 2014/0038721 A1 | 2/2014 | Archer |
| 2014/0067526 A1 | 3/2014 | Raju |
| 2014/0067544 A1 | 3/2014 | Klish |
| 2014/0073436 A1 | 3/2014 | Takagi |
| 2014/0087864 A1 | 3/2014 | Togashi |
| 2014/0089048 A1 | 3/2014 | Bruich |
| 2014/0100020 A1 | 4/2014 | Carroll |
| 2014/0106858 A1 | 4/2014 | Constable |
| 2014/0128137 A1 | 5/2014 | Balise |
| 2014/0157314 A1 | 6/2014 | Roberts |
| 2014/0180725 A1 | 6/2014 | Ton-That |
| 2014/0206449 A1 | 7/2014 | Alman |
| 2014/0206452 A1 | 7/2014 | Bambino |
| 2014/0243065 A1 | 8/2014 | Wright |
| 2014/0243072 A1 | 8/2014 | Santini |
| 2014/0274359 A1 | 9/2014 | Helava |
| 2014/0295958 A1 | 10/2014 | Shono |
| 2014/0309026 A1 | 10/2014 | Inukai |
| 2014/0329585 A1 | 11/2014 | Santini |
| 2014/0337259 A1 | 11/2014 | Lamb |
| 2015/0011305 A1 | 1/2015 | Deardorff |
| 2015/0019349 A1 | 1/2015 | Milley |
| 2015/0031440 A1 | 1/2015 | Desanti |
| 2015/0065241 A1 | 3/2015 | McCarthy |
| 2015/0065256 A1 | 3/2015 | Cudak |
| 2015/0273320 A1 | 10/2015 | Pieron |
| 2015/0306494 A1 | 10/2015 | Pieron |
| 2015/0335995 A1 | 11/2015 | McLellan |
| 2015/0352436 A1 | 12/2015 | Pieron |
| 2016/0038083 A1 | 2/2016 | Ding |
| 2016/0121219 A1 | 5/2016 | Kim |
| 2016/0236094 A1 | 8/2016 | Pieron |
| 2016/0361654 A1 | 12/2016 | Pieron |
| 2017/0132874 A1 | 5/2017 | Curtis |
| 2017/0132879 A1 | 5/2017 | Alexander |
| 2018/0065042 A1 | 3/2018 | Mclellan |
| 2018/0153463 A1 | 6/2018 | Nissila |
| 2018/0345150 A1 | 12/2018 | Pieron |
| 2018/0353862 A1 | 12/2018 | Pieron |
| 2018/0361256 A1 | 12/2018 | Chu |
| 2019/0134396 A1 | 5/2019 | Toth |
| 2019/0266628 A1 | 8/2019 | Schultz |
| 2019/0279466 A1 | 9/2019 | Schultz |
| 2019/0321734 A1 | 10/2019 | Pieron |
| 2019/0344178 A1 | 11/2019 | Pieron |
| 2020/0047072 A1 | 2/2020 | Patenge |
| 2020/0151751 A1 | 5/2020 | Schultz |
| 2020/0205747 A1 | 7/2020 | Mulligan |

FOREIGN PATENT DOCUMENTS

| | | |
|---|---|---|
| WO | 2013013281 | 1/2013 |
| WO | 2013059639 | 1/2013 |
| WO | 2015013373 | 1/2015 |
| WO | 2015153010 | 10/2015 |
| WO | 2015168187 | 11/2015 |
| WO | 2015179450 | 11/2015 |
| WO | 2015196105 | 12/2015 |

OTHER PUBLICATIONS

"A Wondrous Drop Event and Double EXP", [dated Aug. 22, 2012], From flyff-wiki. [online], [retrieved on Jan. 12, 2016]. Retrieved from the Internet <URL:http://flyff-wiki.webzen.com/wiki/A_Wondrous_Drop_Event_and_Double_EXP>. 2 pages.

"Behavioural Analytics & Campaigning", http://lotaris.com/behavioural._analytics_and._Campaigning.htm, screenshot access date May 24, 2012 2:21 PM, 1 page.

(56) References Cited

OTHER PUBLICATIONS

"Building Structures". War2.warcraft.org. Online. Accessed via the Internet. Accessed Aug. 9, 2014. <URL: http://war2.warcraft.org/strategy/verybasics/building.shtml>, 3 pages.

"Cataclysm Guide: Guild Advancement—Wowhead", http://www.wowhead.com/guide=cataclysm&guilds, printed Dec. 5, 2013, 4 pages.

"Clash of Clans". Wikipedia.org. Online. Accessed via the Internet. Accessed Aug. 9, 2014. <URL: http://en.wikipedia.org/wiki/Clash of Clans>, 3 pages.

"Digital River World Payments and Lotaris Partner to Extend Mobile Application Licensing and Monetization Capabilities to Software Publishers", Business Wire Press Release, http://www.marketwatch.com/story/digital-river-world-payments-and-lotaris . . . , posted San Francisco, Mar. 27, 2012 (Business Wire), 8:30 a.m. EDT, printed May 24, 2012 2:32 PM, 3 pages.

"Digital River World Payments and Lotaris Partner to Extend Mobile Application Licensing and Monetization Capabilities to Software Publishers", Lotaris Press Release, http://www.lotaris.com/digital_river_world_payments_and_lotaris_partne . . . , posted Tuesday, Mar. 27, 2012, screenshop access date May 24, 2012, 2:19 PM, 1 page.

"Flyff", [dated May 25, 2013]. From Wikipedia, The Free Encyclopedia. [on line], [retrieved on Jan. 12, 2016]. Retrieved from the Internet<URL:https://en.wikipedia.org/w/index.php? title=Flyff &oldid=556751091 >. 4 pages.

"Gem calculation formulas", forum.supercell.net. Online. Accessed via the Internet. Accessed Aug. 9, 2014. <URL: http://forum.supercell.net/showthread.php/23028-Gem-calculation-formulas>, 3 pages.

"Getting Started" written by BoD, published on Oct. 13, 2011 and printed from URL<http://lotrowiki.com/index.php?title=Getting_Started&oldid=349681 >, 5 pages.

"Guild Housing System—FlyFF Wiki", http://flyff-wiki.gpotato.com/wiki/Guild_Housing_System, printed Dec. 5, 2013, 5 pages.

"How Town Hall to Level 4". Forum.supercell.net. Online. Jan. 31, 2013. Accessed via the Internet. Accessed Feb. 21, 2015. URL:http://forum.supercell.net/showthread.php/15052-How-Town-Hall-to-Level-4, 2 pages.

"I don't have enough resources/builders to upgrade anything in my village, what can I do?" gamesupport.supercell.net. Online. Accessed via the Internet. Accessed Aug. 9, 2014. <URL: https://gamesupport.supercell.net/hc/en-US/articles/421482-I-don-t-have-enough-resources-builders-to-upgrade-anything-in-my-village-what-can-I-do->, Apr. 23, 2014, 9 pages.

"Kabam Community Forums > Kingdoms of Camelot > Kingdoms of Camelot Open Discussion > Open Discussion : Tournament of Might Prizes / Main Discussion thread", printed from http://community.kabam.com/forums/archive/index.php/t-43273.html, Oct. 24, 2011, 23 pages.

"Lotro Store" written by Elinnea, published on Dec. 15, 2011 and printed from URL <http://lotrowiki.com/index.php ?title=LOTRO_Store&oldid=396550>, 23 pages.

"Lotro-Wiki.com" (evidence in regards to "Lord of the Rings Online" MMORPG game), latest Dec. 22, 2011, <http://lotrowiki.com/index.php/Main_Page), http://lotro-wiki.com/index.php? title=LOTRO_Store&oldid=396550, http://lotro-wiki.com/index.php? title=Quest:A_Little_Extra_Never_Hurts_—_Part_1&oldid=399597, Links are to used articles, 28 pages.

"Lotro-Wiki.com" (evidence in regards to "Lord of the Rings Online" MMORPG game), latest Dec. 22, 2011, http://lotro-wiki.com/index.php/Main_Page) (http://lotro-wiki.com/index.php? title=LOTRO_Store&oldid=396550, http://lotro-wiki.com/index.php? title=Quest:A_Little_Extra_Never_Hurts_—_Part_1&oldid=399597, http://lotro-wiki.com/index.php? title=Quest:A_Little_Extra_Never_Hurts_—_Part_2&oldid=399366, http://lotro-wiki.com/index.php? title=Getting_Started&oldid=349681, Links are to used articles, 33 pages.

"Main Page" written by Starbusty, published on Dec. 12, 2011 and printed from URL<http://lotrowiki.com/index.php?title=Main_Page &oldid=394429>, 2 pages.

"Quest: A Little Extra Never Hurts—Part 1" written by Zimoon, published on Dec. 22, 2011 and printed from URL <http://lotro-wiki.com/index.php?title=Quest:A_Little_Extra_Never_Hurts_—_Part_1 &oldid=399597>, 3 pages.

"Quest: A Little Extra Never Hurts—Part 2" written by Zimoon, published on Dec. 21, 2011 and printed from URL <http://lotro-wiki.com/index.php?title=Quest:A_Little_Extra_Never_Hurts_—_Part_2&oldid=399366>, 2 pages.

"Rest—WoWWiki—Your guide to the World of Warcraft", printed from http://www.wowwiki.com/Rest, May 19, 2014, 2 pages.

"Scroll of Amplification R", [dated Apr. 26, 2012], From flyff-wiki. [online], [retrieved on Jan. 12, 2016]. Retrieved from the Internet<URL:http://flyff-wiki.webzen.com/wiki/Scroll_of_Amplification_R>. 3 pages.

"Treasure Chest Game" written by Zelda Wiki, the Zelda encyclopedia; published on or before Oct. 17, 2012; accessible andprinted from URL http://web.archive.org/web/20121017085058/http://zeldawiki.org/Treasure_Chest_Game>, 4 pages.

"Warcraft II: Tides of Darkness". Wikipedia.org. Online. Accessed via the Internet. Accessed Aug. 9, 2014. <URL: http://en.wikipedia.Org/wiki/Warcraft_II:_Tides_of_Darkness>, 10 pages.

<http://lotro-wiki.com/index.php?title=Quest:A_Little_Extra_Never_Hurts_—_Part_2&oldid=399366>, <http://lotrowiki.com/index.php ?title=Getting_ Started&oldid=349681 >. Links are to used articles. (7 pgs) Feb. 26, 2014.

City Coins. CityVille Wikia. Online. Accessed via the Internet. Accessed Aug. 9, 2014. <URL: http://cityville.wikia.com/wiki/City_Coins>, 2 pages.

Diablo 2, Blizzard Entertainment, Mar. 23, 2009, manual and online website, http://web.archive.Org/web/20090323171356/http://classic.battle.net/diablo 2exp/items/basics.shtml, 51 pages.

Dreamslayer's Enchanting and Upgrading Guide—With Pictures:D and Explanations, URL: forums.elswordonline.com/Topic5673.aspx [Retrieved Feb. 21, 2013], 8 pages.

Elsword—Wikipedia, the free encyclopedia, URL: en.wikipedia.org/wiki/Elsword [Retrieved Feb. 21, 2013], 6 pages.

Elsword, Dec. 27, 2007, KOG Studios, Guide posted Mar. 17, 2011, http://forums.elswordonline.com/topic5673.aspx, http://en.wikipedia.org/wiki/Elsword, 16 pages.

FriskyMongoose "Happy Island Updates", available Jun. 12, 2012 from https://web.archive.org/web/20120612004417/http://friskymongoose.com/happy-island-updates-new-attractions-decorations-and-limited-edition-item-bundles/, 7 pages.

Gaia "Black Friday Bundle" available on Nov. 23, 2011, from http://www.gaiaonline.com/forum/community-announcements/black-friday-big-bundles-rare-items/t.76127933/, 5 pages.

Gem System—Street Fighter X Tekken, http://www.streetfighter.com/us/sfxtk/features/gem-system, printed Nov. 6, 2012, 6 pages.

Hamari, Juho, "Game Design as Marketing: How Game Mechanics Create Demand for Virtual Goods", available on vol. 5, Issue 1, 2010, retrieved from Int. Journal of Business Science and Applied Management—http://www.business-and-management.org/library/2010/5_1-14-29-Hamari,Lehdonvirta.pdf, on May 26, 2015, 16 pages.

Katkoff, Michail, "Clash of Clans—the Winning Formula", Sep. 16, 2012, retrieved from Internet on Sep. 30, 2015 from URL <http://www.deconstructoroffun.com/2012/09/clash-of-clans-winning-formula.html>, 13 pages.

MapleStory—Guides—Equipment Upgrading 101: Enhancements, URL: maplestory.nexon.net/guides/game-play/systems/OOFIk; [Retrieved Jun. 24, 2013] 3 pages.

MapleStory—Guides—Equipment Upgrading 101: Potentials, URL: maplestory.nexon.net/guides/game-play/systems/OOFIj/ [Retrieved Jun. 24, 2013], 5 pages.

MapleStory—Guides—Equipment Upgrading 101: Scrolls, URL: maplestory.nexon.net/guides/game-play/systems/OOFFV/#mitigating [Retrieved Jun. 24, 2013], 4 pages.

Maplestory, Internet guide: http://maplestory.nexon.net/guides/game-play/systems/00FIk/, http://maplestory.nexon.net/guides/game-play/systems/00FIk, http://maplestory.nexon.net/guides/game-play/systems/00FFV, Sep. 28, 2012, 12 pages.

(56) References Cited

OTHER PUBLICATIONS

MMO Site "Rose Online Launches the Newest in Game Feature"; available Aug. 11, 2011 from https://web.archive.org/web/20110811231226/http://news.mmosite.com/content/2011-06-21/rose_online_launches_the_newest_in_game_feature.1.shtml, 3 pages.
New Feature: Tiered Tournaments and Tournament Updates, printed from http://community.kabam.com/forums/showthread.php7171349-New-Feat on Feb. 11, 2014, 2 pages.
Ozeagle, "What happens if. . . answers about account types" on Lotro forum, Jan. 18, 2011 ,<https://www.lotro.com/forums/showthread.php7377885-What-happens-if-answers-about-the-account-types> (16 pgs).
Path of Exile—Forum—Beta General Discussion—Unique Items Compendium 60/71 URL: web.archive.org/web/20120608004658/http://www.pathofexile.com/forum/view-thread/12056 [Retrieved Jun. 24, 2013], 52 pages.
Path of Exile, Internet posting: http://web.archive.Org/web/20120606004658/http://www.pathofexile.com/forum/view-thread/12056, Nov. 16, 2011, 52 pages.
PCT International Search Report and Written Opinion for PCT/US2016/017637 dated Apr. 7, 2016, 12 pages.
Profession—WoWWiki—Your guide to the World of Warcraft, URL: http://www.wowwiki.com/Profession, printed Nov. 6, 2012, 8 pages.
Super Mario Bros. 3 Review, Nintendo for NES, Feb. 1990, pp. 1-4.
Super Mario Bros. 3, NES Gameplay, http://www.youtube.com/watch?v=82TL-Acm4ts, Published on Mar. 14, 2009, 1 page.
Super Mario Bros. 3, StrategyWiki, the video game walkthrough and strategy guide, http://strategywiki.org/wiki/Super_Mario_Bros._3, Oct. 2, 2012, 4 pages.
TFF Challenge—UC Davis, http://tffchallenge.com/team/uc-davis/, printed Jan. 15, 2014, 12 pages.
TFWiki "teamfortress wiki" available Nov. 5, 2011 retrieved from https://web.archive.org/web/20111105044256/http://wiki.teamfortress.com/wiki/Loadout, 4 pages.
The Arreat Summit—Items: Basic Item Information, URL: web.archive.org/web/20090323171356/http://classic.battle.net/diablo2exp/items/basics.shtml [Retrieved Feb. 21, 2013], 3 pages.
Ubc, "Theory of Auctions" available on Mar. 24, 2012 from https://web.archive.org/web/20120324204610/http:/montoya.econ.ubc.ca/Econ522/auctions.pdf, slide 5, Para. 1.3, 19 pages.
Wiki "Gaia online'", available on Sep. 9, 2011, https://web.archive.org/web/20110927210155/http://en.wikipedia.org/wiki/Gaia_Online, 8 pages.
Wikipedia, Mafia Wars, <http://en.wikipedia.org/wiki/Mafia_Wars>, Jan. 28, 2012, 3 pages.

\* cited by examiner

EVENT-BASED CURRENCY

FIELD OF THE DISCLOSURE

This disclosure relates generally to event-specific currency, such as virtual currency for an event within a virtual space that is available and/or distributed to users during an event time period for performing certain operations and/or achievements during the event time period.

BACKGROUND

Virtual currency provides users of virtual spaces with an alternative to real-world money for obtaining in-space benefits, while providing service providers with a source of revenue by offering the virtual currency in exchange for real-world money. Because the virtual currency that is offered in virtual spaces is typically "permanent," users of the virtual spaces generally associate certain values to the virtual currency over time, which limits profitability associated with purchases of virtual currency per unit and/or perceived benefits of the virtual currency per unit when offered to users as an incentive to perform operations/achievements. In addition, while promotional events relating to a virtual currency regularly used in a virtual space (e.g., discounting of price of the virtual currency, offers of the virtual currency as an incentive to perform operations/achievements, etc.) may have the effect of boosting short-term profits or in-space operations/achievements, such promotional events may have lingering long-term negative effects, for instance, relating to profitability from sale of the virtual currency or perceived benefits of the virtual currency by users.

SUMMARY

One aspect of the disclosure relates to a system configured to facilitate event-based currency, in accordance with one or more implementations. In exemplary implementations, a default virtual currency that may be usable by users of a game space to purchase in-space benefits may be made available to the users. An event conducted in the game space during a predetermined event time period may be managed such that, during the event time period, an event virtual currency may be distributed to one or more of the users as a reward for certain operations and/or achievements performed in the game space during the event time period. In-space benefits associated with the event virtual currency may be provided during the event time period to individual ones of the users in exchange for the distributed event virtual currency of the individual users. After the event time period, the event virtual currency may become unusable by or unavailable to the users. In this way, among other benefits, negative impact on the default virtual currency that is associated with virtual-currency-related promotions may be avoided or otherwise reduced.

In some implementations, the system may include one or more servers. The server(s) may be configured to communicate with one or more client computing platforms according to a client/server architecture. The users may access the system and/or a virtual space (e.g., a virtual world, a game space, etc.) via the client computing platforms.

The server(s) may be configured to execute one or more computer program modules to facilitate event-based currency. The computer program modules may include one or more of a game module, a default currency module, an event module, an exchange module, a user module, and/or other modules. In some implementations, the client computing platforms may be configured to execute one or more computer program modules that are the same as or similar to the computer program modules of the server(s) to facilitate event-based currency.

The game module may be configured to execute an instance of a game space. The game module may be configured to facilitate presentation of views of the game space to users. The game space may be configured to facilitate interaction of the users with the game space and/or each other by performing operations in the game space in response to commands received from the users. The users may include a first user, a second user, and/or other users.

The default currency module may be configured to manage a first virtual currency usable by the users to purchase in-space benefits. In certain implementations, the default currency module may be configured such that the first virtual currency may be purchasable with real-world money or a second virtual currency. In some implementations, the in-space benefits purchasable with the first virtual currency may include one or more of virtual goods, accesses to regions of the game space, abilities to perform operations in the game space, or other in-space benefits.

The event module may be configured to manage an event in the game space that is conducted during an event time period. The event module may be configured such that, during the event time period, an event virtual currency is distributed to one or more of the users as a reward for certain operations and/or achievements performed in the game space during the event time period.

In certain implementations, the default currency module may be configured such that the first virtual currency is available to the users during the event time period. In some implementations, the default currency module may be configured such that the first virtual currency is available to the users during and after the event time period.

The exchange module may be configured to effectuate, for one or more of the users, exchanges of in-space benefits associated with the event virtual currency. The in-space benefits associated with the event virtual currency may include one or more of virtual goods, accesses to regions of the game space, abilities to perform operations in the game space, or other in-space benefits.

In some implementations, the event module may be configured such that the event virtual currency may be purchasable with real-world money or a second virtual currency. In other implementations, the event module may be configured such that the event virtual currency may not be purchased with other currencies.

In certain implementations, the event module may be configured to deactivate the event virtual currency after the event time period. For example, the event virtual currency may be deactivated such that the event virtual currency is not available to the user after the event time period. In various implementations, the event module may be configured such that the event virtual currency is distributed to a first user responsive to the first user performing a first operation and/or achievement during the event time period, and such that the event virtual currency is not distributed to the first user responsive to the first user performing the first operation and/or achievement after the event time period. In some implementations, the event module may be configured such that the event virtual currency expires after the event time period.

In various implementations, the exchange module may be configured such that the in-space benefits associated with the event virtual currency may be different than the in-space benefits purchasable with the first virtual currency.

In certain implementations, the exchange module may be configured such that at least one of the in-space benefits associated with the event virtual currency is the same as at least one of the in-space benefits purchasable with the first virtual currency. In some implementations, the exchange module may be configured to manage costs associated with purchase of in-space benefits. The exchange module may be configured such that the costs include (i) a first set of costs for purchasing individual in-space benefits of a first set of in-space benefits using the first virtual currency and (ii) a second set of costs for purchasing the individual in-space benefits of the first set of in-space benefits using the event virtual currency.

In various implementations, the user module may be configured to manage virtual currency account information for the users. In some implementations, the user module may be configured to, responsive to a determination that the event time period has passed, modify the virtual currency account information to remove indications that the users have event virtual currency.

These and other features, and characteristics of the present technology, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and in the claims, the singular form of "a", "an", and "the" include plural referents unless the context clearly dictates otherwise.

DETAILED DESCRIPTION

Figure 1:
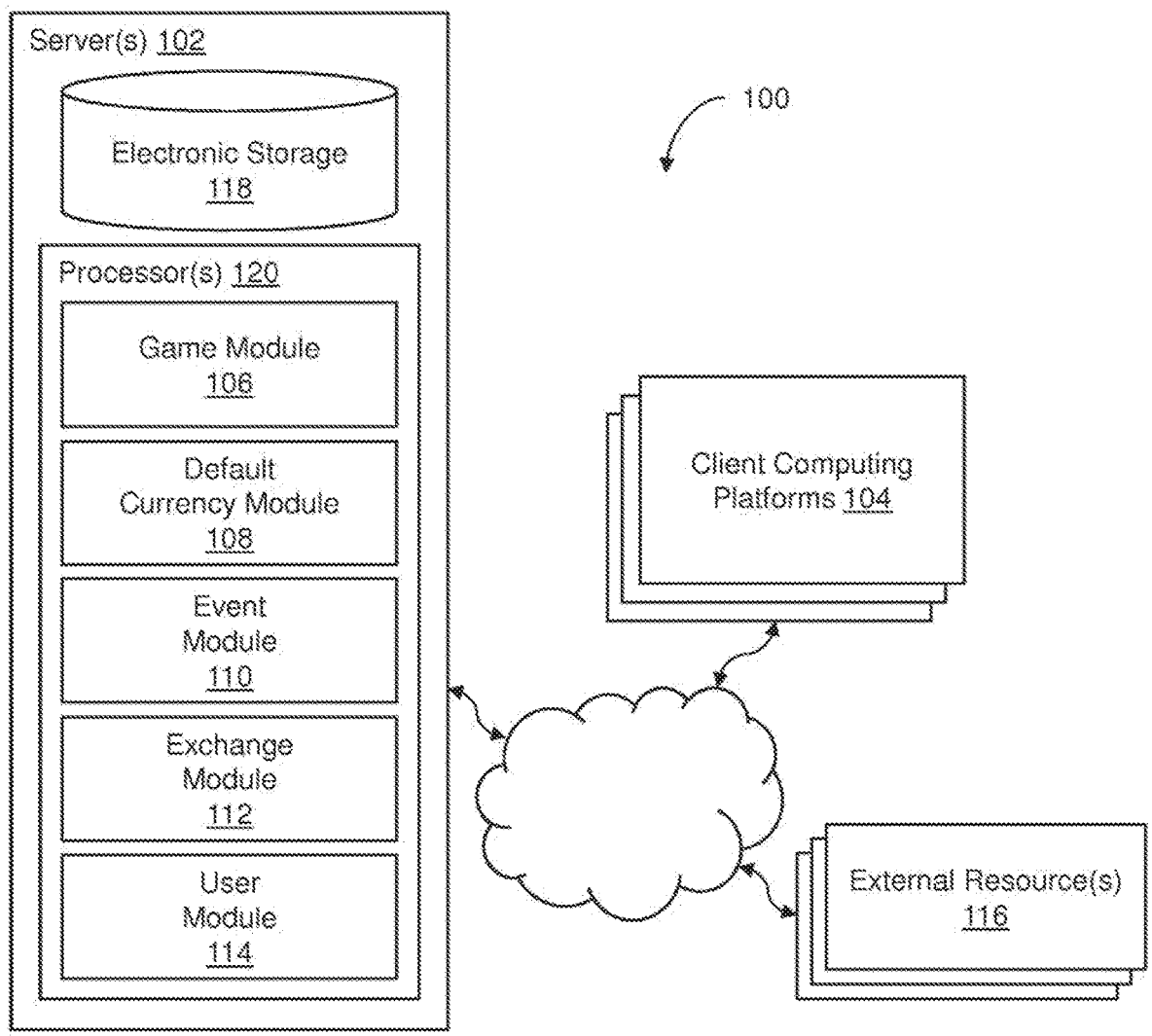
FIG. 1 illustrates a system configured to facilitate event-based currency, in accordance with one or more implementations.

FIG. 1 illustrates a system 100 configured to facilitate event-based currency, in accordance with one or more implementations. In exemplary implementations, a default virtual currency that may be usable by users of a game space to purchase in-space benefits may be made available to the users. An event conducted in the game space during a predetermined event time period may be managed such that, during the event time period, an event virtual currency may be distributed to one or more of the users as a reward for certain operations and/or achievements performed in the game space during the event time period. For example, a first user may be provided with a first amount of the event virtual currency responsive to performing a first operation and/or achievement during the event time period and a second amount of event virtual currency responsive to performing a second operation and/or achievement during the event time period.

In-space benefits associated with the event virtual currency may be provided during the event time period to individual ones of the users in exchange for the distributed event virtual currency of the individual users. These in-space benefits may, for instance, be automatically allocated to the individual users when they obtain a threshold amount of the event virtual currency. The in-space benefits may be allocated to the individual users during the event time period in accordance with the amounts of the event virtual currency held by the individual users at some predetermined time during the event time period. A particular in-space benefit may be allocated to a user when that user purchases the in-space benefit during the event time period in exchange for an amount of the event virtual currency that is associated with the in-space benefit.

After the event time period, the event virtual currency may become unusable by or unavailable to the users. On the other hand, in some implementations, the default virtual currency may independently remain available to the users for purchase (e.g., in exchange for real-world money, in exchange for other virtual currencies, etc.) or to purchase in-space benefits. In this way, promotional events (e.g., contests, third-party sponsored events, etc.) may be applied in the game space using the event virtual currency in lieu of or in addition to the default virtual currency for such events. Among other benefits, events that utilize event virtual currency may have little or no adverse effect on the default virtual currency while providing revenue for service providers or incentives to encourage users to perform designated operations and/or achievements.

In some implementations, system 100 may include one or more servers 102. Server(s) 102 may be configured to communicate with one or more client computing platforms 104 according to a client/server architecture. The users may access system 100 and/or a virtual space (e.g., a virtual world, a game space, etc.) via client computing platforms 104.

Server(s) 102 may be configured to execute one or more computer program modules to facilitate event-based currency. The computer program modules may include one or more of a game module 106, a default currency module 108, an event module 110, an exchange module 112, a user module 114, and/or other modules. In some implementations, client computing platforms 104 may be configured to execute one or more computer program modules that are the same as or similar to the computer program modules of server(s) 102 to facilitate event-based currency.

Game module 106 may be configured to execute an instance of a game space. In some implementations, the game space may be a virtual space. As such, an instance of the game space may be an instance of the virtual space. A space module (not shown for illustrative convenience) may be configured to implement the instance of the virtual space executed by the computer modules. The instance of the virtual space may reflect the state of the virtual space. The instance of the virtual space may be used to push state information to clients for implementation on the clients, may be used to verify state information generated on clients executing expressions of the instance locally, and/or for other purposes. State information may include information about the state of the virtual space such as, without limitation, position information of one or more objects, topography information, object status/shape information, battle information, score information, user or character progress information, user inventory information, progress information for one or more activities or actions, view information describing a view of the virtual space, and/or other information that describes the state of the virtual space. Expressions of the instance executed on the clients facilitate presentation of views on the clients of the virtual space. Expressions of the instance executed on the clients may be configured to simply present views of the virtual space based on the state information (e.g., via streaming view information, object/position information, and/or other state information) received from the space module. Expressions of the instance executed on the clients may include space logic that effectively provides for execution of a limited version of the instance on a client that is synchronized and/or verified with state information received from the space module. The view presented on a given client may correspond to a location in the virtual space (e.g., the location from which the view is taken, the location the view depicts, and/or other locations), a zoom ratio, a dimensionality of objects, a point-of-view, and/or view parameters. One or more of the view parameters may be selectable by the user.

The instance of the virtual space may comprise a simulated space that is accessible by users via clients (e.g., client computing platforms 104) that present the views of the virtual space to a user. The simulated space may have a topography, express ongoing real-time interaction by one or more users, and/or include one or more objects positioned within the topography that are capable of locomotion within the topography. In some instances, the topography may be a 2-dimensional topography. In other instances, the topography may be a 3-dimensional topography. The topography may include dimensions of the space, and/or surface features of a surface or objects that are "native" to the space. In some instances, the topography may describe a surface (e.g., a ground surface) that runs through at least a substantial portion of the space. In some instances, the topography may describe a volume with one or more bodies positioned therein (e.g., a simulation of gravity-deprived space with one or more celestial bodies positioned therein). The instance executed by the computer modules may be synchronous, asynchronous, and/or semi-synchronous.

The above description of the views of the virtual space determined from the instance executed by the space module is not intended to be limiting. The virtual space may be presented in a more limited, or more rich, manner. For example, views of the virtual space may be selected from a limited set of graphics depicting an event in a given place within the virtual space. The views may include additional content (e.g., text, audio, pre-stored video content, and/or other content) that describes particulars of the current state of the place, beyond the relatively generic graphics. For example, a view may include a generic battle graphic with a textual description of the opponents to be confronted. Other representations of individual places within the virtual space are contemplated.

Within the instance of the virtual space executed by the space module, users may control characters, objects, simulated physical phenomena (e.g., wind, rain, earthquakes, and/or other phenomena), and/or other elements within the virtual space to interact with the virtual space and/or each other. The user characters may include avatars. As used herein, the term "user character" may refer to an object (or group of objects) present in the virtual space that represents an individual user. The user character may be controlled by the user with which it is associated. The user controlled element(s) may move through and interact with the virtual space (e.g., non-user characters in the virtual space, other objects in the virtual space). The user controlled elements controlled by and/or associated with a given user may be created and/or customized by the given user. The user may have an "inventory" of virtual goods and/or currency that the user can use (e.g., by manipulation of a user character or other user controlled element, and/or other items) within the virtual space.

The users may participate in the instance of the virtual space by controlling one or more of the available user controlled elements in the virtual space. Control may be exercised through control inputs and/or commands input by the users through client computing platforms 104. The users may interact with each other through communications exchanged within the virtual space. Such communications may include one or more of textual chat, instant messages, private messages, voice communications, and/or other communications. Communications may be received and entered by the users via their respective client computing platforms 104. Communications may be routed to and from the appropriate users through server(s) 102 (e.g., through the space module).

Default currency module 108 may be configured to manage a first virtual currency usable by the users to purchase in-space benefits. In certain implementations, default currency module 108 may be configured such that the first virtual currency may be purchasable with real-world money or a second virtual currency. In some implementations, the in-space benefits purchasable with the first virtual currency may include one or more of virtual goods, accesses to regions of the game space, abilities to perform operations in the game space, or other in-space benefits.

By way of example, the first virtual currency may be a default virtual currency that is available for purchase by the users or use by the users to purchase in-space benefits. In one use case, a particular user may purchase 1000 Gems in exchange for 50 units of real-world money (e.g., US$50), and the user's account may be credited with 1000 Gems. The user may then pay for a specific virtual good (e.g., a food/beverage item, a clothing item, an accessory item, a weapon item, a time reduction item, etc.) with the purchased Gems, and the cost of the virtual good may be deducted from the user's account.

Event module 110 may be configured to manage an event in the game space that is conducted during an event time period. Event module 110 may be configured such that, during the event time period, an event virtual currency is distributed to one or more of the users as a reward for certain operations and/or achievements performed in the game space during the event time period.

Figure 2:
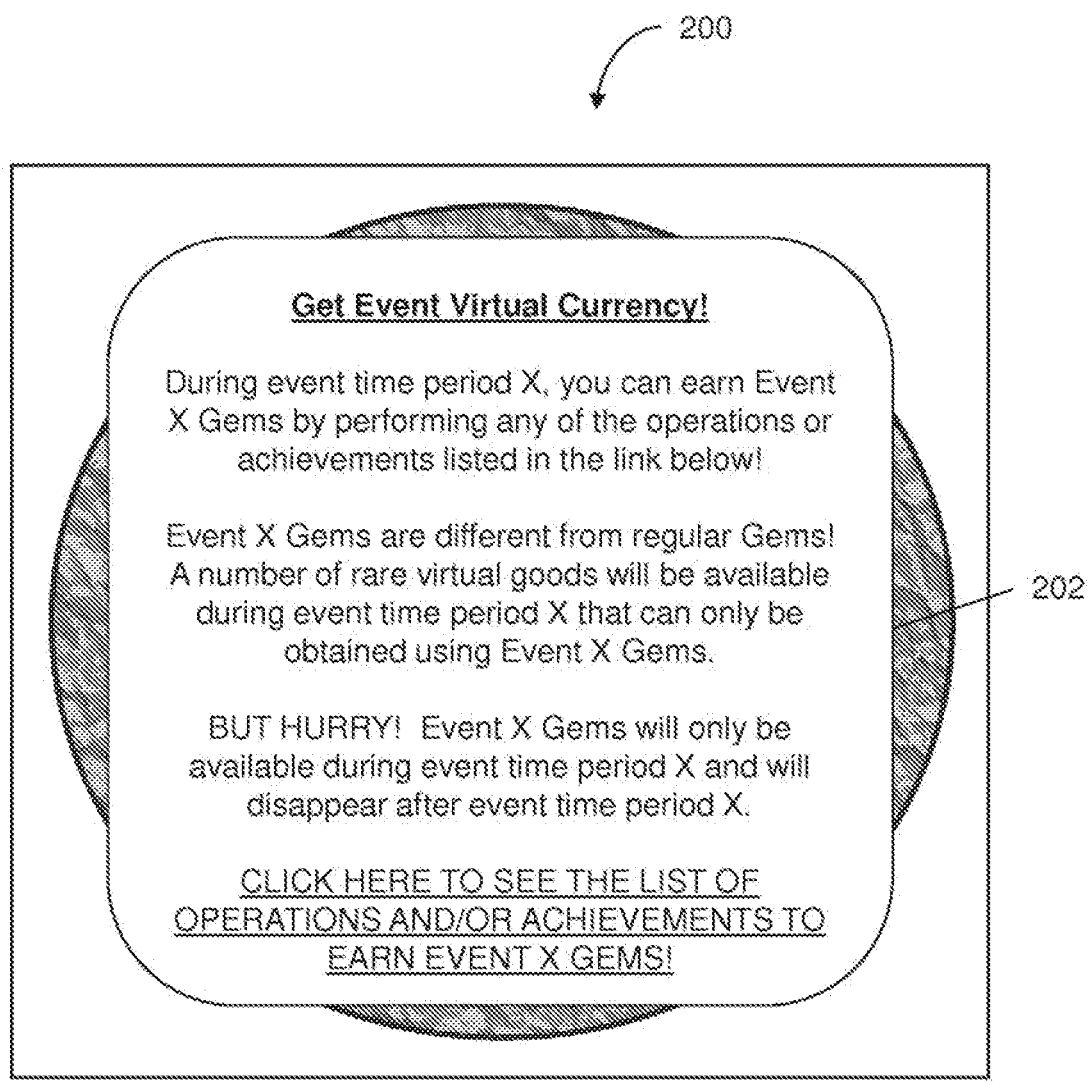
FIG. 2 illustrates a user interface depicting a notification in a game space that indicates an event to be conducted during an event time period in which event virtual currency associated with the event will be available, in accordance with one or more implementations.

For example, FIG. 2 illustrates a user interface 200 depicting a notification 202 in a game space that indicates an event to be conducted during an event time period in which event virtual currency associated with the event will be available, in accordance with one or more implementations. As indicated by notification 202, in one scenario, users may earn Event X Gems during event time period X by performing one or more listed operations and/or achievements. As an example, the listed operations and/or achievements may include visiting a virtual store in the virtual space depicted by user interface 200, purchasing one or more virtual goods at the virtual store, engaging in battle with other users in the virtual space, defeating one or more enemies in the virtual space, joining an alliance of users, checking in to a particular location in the virtual space, collecting a certain amount of resources of a particular type in the virtual space, building a certain structure in the virtual space, trying out new features available via the virtual space, or other operations and/or achievements.

In certain implementations, default currency module 108 may be configured such that the first virtual currency is available to the users during the event time period. In some implementations, default currency module 108 may be configured such that the first virtual currency is available to the users during and after the event time period. For example, virtual currency account information for the users may indicate amounts of the first virtual currency credited to individual ones of the users before, during, and/or after the event time period. The individual users may use their first virtual currency before, during, and/or after the event time period to purchase in-space benefits based on their amounts of the first virtual currency indicated by the virtual currency account information.

Exchange module 112 may be configured to effectuate, for one or more of the users, exchanges of in-space benefits associated with the event virtual currency. The in-space benefits associated with the event virtual currency may include one or more of virtual goods, accesses to regions of the game space, abilities to perform operations in the game space, or other in-space benefits.

By way of example, with respect to FIG. 2, users may earn Event X Gems during event time period X by performing one or more listed operations and/or achievements. During event time period X, in-space benefits purchasable with the earned Event X Gems may be exchanged for one or more amounts of Event X Gems earned by the users. In one scenario, for instance, in-space benefits may be automatically allocated to individual ones of the users when they obtain a threshold amount of Event X Gems. For example, when a particular user collects 1000 Event X Gems for the first time during event time period X, allocation of a first rare virtual good to the user's account may be initiated, and 1000 Event X Gems may be deducted from the user's account. When the user collects another 1500 Event X Gems during event time period X, allocation of a second rare virtual good to the user's account may be initiated, and 1500 Event X Gems may be deducted from the user's account.

In another scenario, the in-space benefits may be allocated to the individual users during the event time period in accordance with the amounts of the event virtual currency held by the individual users at some predetermined time during the event time period. For example, event time period X may include 5 event sub-periods X1-X5. User categories associated with the event indicated by notification 200 may include a first category of users that have collected 0-999 Event X Gems by the end of a sub-period, a second category of users that have collected 1000-1999 Event X Gems by the end of a sub-period, and a third category of users that have collected 2000 or more Event X Gems by the end of a sub-period. At the end of each of the sub-periods X1-X5, the individual amounts of Event X Gems that each of the users have collected by performing certain operations and/or achievements during the respective sub-period may be calculated and deducted from the users' accounts (e.g., users may start with 0 Event X Gems at the beginning of each new sub-period within event time period X). In exchange, the appropriate categories may be determined for each of the users, and rare virtual goods may be allocated to individual ones of the users' accounts in accordance with their respective determined categories. A user in the first category may be allocated a first virtual good, a user in the second category may be allocated a second virtual good, and a user in the third category may be allocated a third virtual good such that the value of the third virtual good is greater than the value of the second virtual good, and the value of the second virtual good is greater than the value of the first virtual good.

In another scenario, the in-space benefits may be allocated to a certain number or percentage of users that collected the most Event X Gems. For example, in exchange for all of the Event X Gems that they collected during event time period X, the top 10% of users with the most Event X Gems at the end of event time period X may be given access to a VIP club in the game space where those users have a chance to win a significant amount of regular Gems.

In another scenario, a particular in-space benefit may be allocated to a user when that user purchases the in-space benefit during the event time period in exchange for an amount of the event virtual currency that is associated with the in-space benefit. For example, a first rare virtual good may be purchased during event time period X for 1000 Event X Gems, a second rare virtual good may be purchased during event time period X for 2000 Event X Gems, and a third rare virtual good may be purchased during event time period X for 3000 Event X Gems.

In some implementations, event module may be configured such that the event virtual currency may be purchasable with real-world money or a second virtual currency. For example, with respect to FIG. 2, a particular user of the game space may purchase 2000 Event X Gems during event time period X in exchange for 50 units of real-world money (e.g., US$50).

In other implementations, the event virtual currency may not be purchased with other currencies. In one use case, users may not be able to buy the event virtual currency, but may obtain the event virtual currency by performing certain operations and/or achievements in the game space during the event time period. In this way, users may have more incentive to perform the certain operations and/or achievements because they may not be able to buy certain sought-after in-space benefits. Such in-space benefits may, for instance, include in-space benefits that may only be purchased during the event time period using the event virtual currency, in-space benefits that may be purchased during the event time period using the event virtual currency and that are difficult to otherwise obtain in the game space, or other sought-after in-space benefits.

Event module 110 may be configured to deactivate the event virtual currency after the event time period. For example, the event virtual currency may be deactivated such that the event virtual currency is not available to the user after the event time period. In one use case, with respect to FIG. 2, the event virtual currency may be Event X Gems. As indicated by notification 202, for instance, Event X Gems will only be available during event time period X. When event time period X is over, all traces of Event X Gems may be "erased" from the game space such that users that have not used all of the Event X Gems that they collected may not access any remaining Event X Gems, and such that users may not collect Event X Gems unless Event X Gems are offered again for another event in the game space. In another use case, other event virtual currency may be utilized for future events in lieu of Event X Gems. For example, Event Y Gems may be used in lieu of Event X Gems during event time period Y, and Event Z Gems may be used in lieu of Event X Gems during event time period Z.

In various implementations, event module 110 may be configured such that the event virtual currency is distributed to a first user responsive to the first user performing a first operation and/or achievement during the event time period, and such that the event virtual currency is not distributed to the first user responsive to the first user performing the first operation and/or achievement after the event time period. For example, referring to FIG. 2, Event X Gems may be provided to a user that performs one of the listed operations and/or achievements if it is determined that the user performed the listed operation and/or achievement during event time period X. On the other hand, if the user performed the listed operation and/or achievement after event time period X, Event X Gems may not be provided to the user.

In some implementations, event module 110 may be configured such that the event virtual currency expires after the event time period. In one use case, for instance, all of the event virtual currency that a user collects by performing certain operations and/or achievements during the event time period may be rendered unusable to redeem in-space benefits. As such, in another scenario, while the user may still have the amount of the event virtual currency that he/she collected during the event time period, the user may not be able to use the event virtual currency in the game space for anything of value. In yet another scenario, all of the event virtual currency that the user collected during the event time period will be removed from the user's account upon expiration of the event virtual currency.

In various implementations, exchange module 112 may be configured such that the in-space benefits associated with the event virtual currency may be different than the in-space benefits purchasable with the first virtual currency. As an example, a first virtual good may be provided to a first user in exchange for some amount of the event virtual currency from the first user, but the first virtual good may not be exchangeable for any amount of the first virtual currency. As another example, a second virtual good may be provided to the first user in exchange for some amount of the first virtual currency from the first user, but the second virtual good may not exchangeable for any amount of the event virtual currency.

In certain implementations, exchange module 112 may be configured such that at least one of the in-space benefits associated with the event virtual currency is the same as at least one of the in-space benefits purchasable with the first virtual currency. In some implementations, exchange module 112 may be configured to manage costs associated with purchase of in-space benefits. Exchange module 112 may be configured such that the costs include (i) a first set of costs for purchasing individual in-space benefits of a first set of in-space benefits using the first virtual currency and (ii) a second set of costs for purchasing the individual in-space benefits of the first set of in-space benefits using the event virtual currency.

For example, with respect to FIG. 2, a particular rare virtual good of which only 100 units may be distributed per month may be offered for purchase during event time period X in exchange for 3000 Event X Gems (e.g., the event virtual currency). During the same time period or a different time period, the particular rare virtual good may be offered for purchase in exchange for 2000 Gems (e.g., the first virtual currency) (48) User module 114 may be configured to access and/or manage one or more user profiles and/or user information associated with users of the system 100. The one or more user profiles and/or user information may include information stored by server 102, one or more of the client computing platforms 104, and/or other storage locations. The user profiles may include, for example, information identifying users (e.g., a username or handle, a number, an identifier, and/or other identifying information) within the virtual space, security login information (e.g., a login code or password), virtual space account information, subscription information, virtual currency account information (e.g., related to currency held in credit for a user), relationship information (e.g., information related to relationships between users in the virtual space), virtual space usage information, demographic information associated with users, interaction history among users in the virtual space, information stated by users, purchase information of users, browsing history of users, a client computing platform identification associated with a user, a phone number associated with a user, and/or other information related to users.

In some implementations, user module 114 may be configured to, responsive to a determination that the event time period has passed, modify the virtual currency account information to remove indications that the users have event virtual currency. For example, with respect to FIG. 2, amounts of Event X Gems may be distributed to users during event time period X such that the virtual currency account information associated with those users may indicate that the users have the distributed amounts. Upon determination that event time period X is over, user module 114 may remove the indications in the virtual currency account information that the users have the distributed amounts so that it appears to the users that they no longer have any Event X Gems.

Server(s) 102, client computing platforms 104, external resources 116, and/or other components may be operatively linked via one or more electronic communication links. For example, such electronic communication links may be established, at least in part, via a network such as the Internet and/or other networks. It will be appreciated that this is not intended to be limiting, and that the scope of this disclosure includes implementations in which server(s) 102, client computing platforms 104, external resources 116, and/or other components may be operatively linked via some other communication media.

A given client computing platform 104 may include one or more processors configured to execute computer program modules. The computer program modules may be configured to enable an expert or user associated with client computing platform 104 to interface with system 100 and/or external resources 116, and/or provide other functionality attributed herein to client computing platforms 104. By way of non-limiting example, client computing platform 104 may include one or more of a desktop computer, a laptop computer, a handheld computer, a netbook, a smartphone, a gaming console, and/or other computing platforms.

External resources 116 may include sources of information, hosts and/or providers of virtual spaces outside of system 100, external entities participating with system 100, and/or other resources. In some implementations, some or all of the functionality attributed herein to external resources 116 may be provided by resources included in system 100.

In some implementations, server(s) 102 may include an electronic storage 118, one or more processor(s) 120, and/or other components. Server(s) 102 may include communication lines, or ports to enable the exchange of information with a network and/or other computing platforms. Illustration of server(s) 102 in FIG. 1 is not intended to be limiting. Server(s) 102 may include a plurality of hardware, software, and/or firmware components operating together to provide the functionality attributed herein to server(s) 102. For example, server(s) 102 may be implemented by a cloud of computing platforms operating together as server(s) 102.

Electronic storage 118 may comprise non-transitory storage media that electronically stores information. The electronic storage media of electronic storage 118 may include one or both of system storage that is provided integrally (i.e., substantially non-removable) with server(s) 102 and/or removable storage that is removably connectable to server(s) 102 via, for example, a port (e.g., a USB port, a firewire port, etc.) or a drive (e.g., a disk drive, etc.). Electronic storage 118 may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. Electronic storage 118 may include one or more virtual storage resources (e.g., cloud storage, a virtual private network, and/or other virtual storage resources). Electronic storage 118 may store software algorithms, information determined by processor(s) 120, information received from server(s) 102, information received from client computing platforms 104, and/or other information that enables server(s) 102 to function as described herein.

Processor(s) 120 is configured to provide information processing capabilities in server(s) 102. As such, processor(s) 120 may include one or more of a digital processor, an analog processor, a digital circuit designed to process information, an analog circuit designed to process information, a state machine, and/or other mechanisms for electronically processing information. Although processor(s) 120 is shown in FIG. 1 as a single entity, this is for illustrative purposes only. In some implementations, processor(s) 120 may include a plurality of processing units. These processing units may be physically located within the same device, or processor(s) 120 may represent processing functionality of a plurality of devices operating in coordination. Processor(s) 120 may be configured to execute modules 106, 108, 110, 112, 114, and/or other modules. Processor(s) 120 may be configured to execute modules 106, 108, 110, 112, 114, and/or other modules by software; hardware; firmware; some combination of software, hardware, and/or firmware; and/or other mechanisms for configuring processing capabilities on processor(s) 120. As noted, in certain implementations, a given client computing platform 104 may include one or more computer program modules that is the same as or similar to the computer program modules of server(s) 102. Client computing platform 104 may include one or more processors that are the same or similar to processor(s) 120 of server(s) 102 to execute such computer program modules of client computing platform 104.

It should be appreciated that although modules 106, 108, 110, 112, and 114 are illustrated in FIG. 1 as being co-located within a single processing unit, in implementations in which processor(s) 120 includes multiple processing units, one or more of modules 106, 108, 110, 112, and/or 114 may be located remotely from the other modules. The description of the functionality provided by the different modules 106, 108, 110, 112, and/or 114 described below is for illustrative purposes, and is not intended to be limiting, as any of modules 106, 108, 110, 112, and/or 114 may provide more or less functionality than is described. For example, one or more of modules 106, 108, 110, 112, and/or 114 may be eliminated, and some or all of its functionality may be provided by other ones of modules 106, 108, 110, 112, and/or 114. As another example, processor(s) 120 may be configured to execute one or more additional modules that may perform some or all of the functionality attributed below to one of modules 106, 108, 110, 112, and/or 114.

Figure 3:
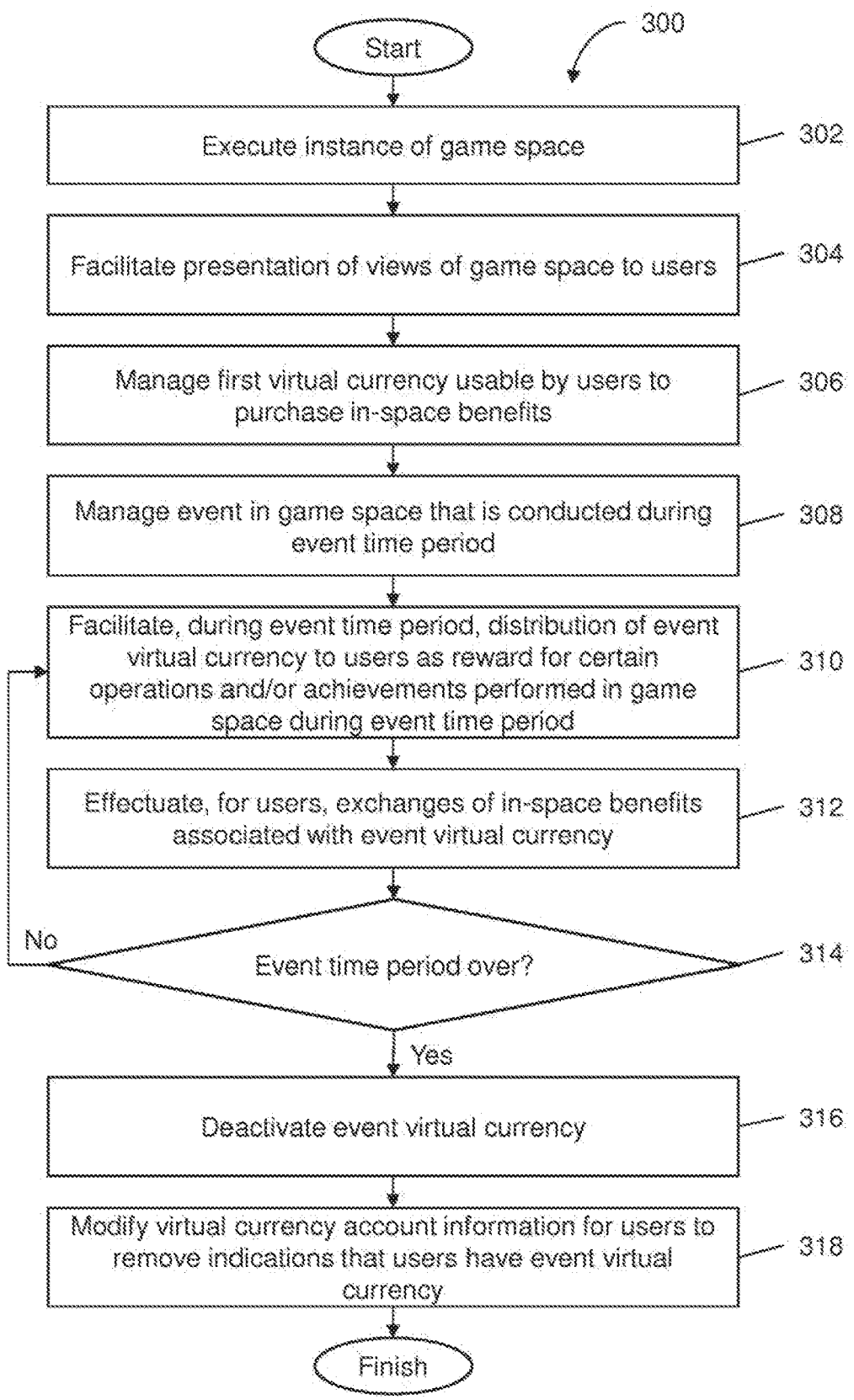
FIG. 3 illustrates a method for facilitating event-based currency, in accordance with one or more implementations.

FIG. 3 illustrates a method for facilitating event-based currency, in accordance with one or more implementations. The operations of method 300 presented below are intended to be illustrative. In some implementations, method 300 may be accomplished with one or more additional operations not described, and/or without one or more of the operations discussed. Additionally, the order in which the operations of method 300 are illustrated in FIG. 3 and described below is not intended to be limiting.

In some implementations, method 300 may be implemented in one or more processing devices (e.g., a digital processor, an analog processor, a digital circuit designed to process information, an analog circuit designed to process information, a state machine, and/or other mechanisms for electronically processing information). The one or more processing devices may include one or more devices executing some or all of the operations of method 300 in response to instructions stored electronically on an electronic storage medium. The one or more processing devices may include one or more devices configured through hardware, firmware, and/or software to be specifically designed for execution of one or more of the operations of method 300.

At an operation 302, an instance of a game space may be executed. Operation 302 may be performed by a game module that is the same as or similar to game module 106, in accordance with one or more implementations.

At an operation 304, presentation of views of the game space to users may be facilitated. The game space may be configured to facilitate interaction of the users with the game space and/or each other by performing operations in the game space in response to commands received from the users. Operation 304 may be performed by a game module that is the same as or similar to game module 106, in accordance with one or more implementations.

At an operation 306, a first virtual currency usable by the users to purchase in-space benefits may be managed. In certain implementations, the first virtual currency may be purchasable with real-world money or a second virtual currency. In some implementations, the in-space benefits purchasable with the first virtual currency may include one or more of virtual goods, accesses to regions of the game space, abilities to perform operations in the game space, or other in-space benefits. Operation 306 may be performed by a default currency module that is the same as or similar to default currency module 108, in accordance with one or more implementations.

At an operation 308, an event in the game space that is conducted during an event time period may be managed. In various implementations, the first virtual currency may be available to the users during the event time period. In some implementations, the first virtual currency may be available to the users during and after the event time period. For example, virtual currency account information for the users may indicate amounts of the first virtual currency credited to individual ones of the users before, during, and/or after the event time period. The individual users may use their first virtual currency before, during, and/or after the event time period to purchase in-space benefits based on their amounts of the first virtual currency indicated by the virtual currency account information. Operation 308 may be performed by an event module that is the same as or similar to event module 110, in accordance with one or more implementations.

At an operation 310, distribution of an event virtual currency to one or more of the users as a reward for certain operations and/or achievements performed in the game space may be facilitated during the event time period. In certain implementations, the event in the game space may be managed such that the event includes the distribution of the event virtual currency responsive to certain operations and/or achievements being performed in the game space. In some implementations, the event virtual currency may be purchasable with real-world money or a second virtual currency. In other implementations, the event virtual currency may not be purchased with other currencies. Operation 310 may be performed by an event module that is the same as or similar to event module 110, in accordance with one or more implementations.

At an operation 312, exchanges of in-space benefits associated with the event virtual currency may be effectuated for one or more of the users. In some implementations, the in-space benefits associated with the event virtual currency may be different than the in-space benefits purchasable with the first virtual currency. As an example, a first virtual good may be provided to a first user in exchange for some amount of the event virtual currency from the first user, but the first virtual good may not be exchangeable for any amount of the first virtual currency. As another example, a second virtual good may be provided to the first user in exchange for some amount of the first virtual currency from the first user, but the second virtual good may not exchangeable for any amount of the event virtual currency. Operation 312 may be performed by an exchange module that is the same as or similar to exchange module 112, in accordance with one or more implementations.

At an operation 314, a determination of whether the event time period is over may be effectuated. Operation 314 may be performed by an event module that is the same as or similar to event module 110, in accordance with one or more implementations. Responsive to a determination that the event time period is over, method 300 may proceed to an operation 316.

At operation 316, the event virtual currency may be deactivated. In certain implementations, the event virtual currency may be deactivated such that the event virtual currency is not available to the user after the event time period. In various implementations, the event virtual currency may be distributed to a first user responsive to the first user performing a first operation and/or achievement during the event time period. The event virtual currency may not be distributed to the first user responsive to the first user performing the first operation and/or achievement after the event time period. In some implementations, the event virtual currency may expire after the event time period. Operation 316 may be performed by an event module that is the same as or similar to event module 110, in accordance with one or more implementations.

At an operation 318, virtual currency account information for the users may be modified to remove indications that the users have the event virtual currency. Operation 318 may be performed by a user module that is the same as or similar to user module 114, in accordance with one or more implementations.

Although the present technology has been described in detail for the purpose of illustration based on what is currently considered to be the most practical and preferred implementations, it is to be understood that such detail is solely for that purpose and that the technology is not limited to the disclosed implementations, but, on the contrary, is intended to cover modifications and equivalent arrangements that are within the spirit and scope of the appended claims. For example, it is to be understood that the present technology contemplates that, to the extent possible, one or more features of any implementation can be combined with one or more features of any other implementation.

What is claimed is:

1. A system for facilitating temporary event-specific currency to users in an online game during events, wherein the users are associated with client devices, wherein the users include a first user, wherein the first user is associated with a first client device, the system comprising:

one or more physical processors configured by machine-readable instructions to:

execute an instance of the online game, and facilitate interaction of the users within the online game in response to user input received from the users through the client devices during gameplay;

transmit game state information obtained from the instance of the online game over the network to the client devices to facilitate presentation of views of the online game to the users on the client devices;

manage a first virtual currency in the online game, wherein the first virtual currency is exchangeable for in-game benefits;

manage user accounts of the users, wherein the user accounts include inventories such that a first user account of the first user includes a first inventory, wherein the first inventory includes a first amount of the first virtual currency;

manage an event in the online game, wherein a duration of the event is temporary;

during the event in the online game that occurs concurrently with the interaction of the users, manage an event-specific virtual currency the users can earn during the event, wherein the event-specific virtual currency is exchangeable for in-game benefits during the event and not after the duration of the event, wherein the in-game benefits obtained by the users in exchange for the event-specific virtual currency persist in the online game after the event, wherein the first inventory includes, during the event, a particular amount of the event-specific virtual currency;

distribute, during the event, amounts of event-specific virtual currency to the users in the online game as a reward for one or both of certain operations performed by the users or achievements accomplished by the users in the online game, such that the particular amount of the event-specific virtual currency is distributed to the first user;

effectuate, responsive to particular user input received from the first user through the first client device, and during the event, an exchange of some or all of the particular amount of event-specific virtual currency for a particular in-game benefit, wherein, due to the exchange, the first inventory is reduced by some or all of the particular amount of event-specific virtual currency, wherein the particular in-game benefit persists in the online game after the event;

after the duration of the event, expire the event-specific virtual currency such that the event-specific virtual currency is not available to the users and no longer exchangeable for any in-game benefits, wherein expiration of the event-specific virtual currency includes providing notifications to the client devices pertaining to the expiration of the event-specific virtual currency; and facilitate particular interaction of the first user in the online game, wherein the particular interaction involves the particular in-game benefit for the first user after the event.

2. The system of claim 1, wherein the one or more processors are further configured to facilitate exchanges of the first virtual currency in the online game by storing information associated with the first virtual currency on electronic storage media.

3. The system of claim 1, wherein the one or more processors are further configured to monitor the instance of the online game to identify one or both of performance of the certain operations or accomplishment of the achievements in the online game.

4. The system of claim 1, wherein the one or more physical processors are further configured such that the first virtual currency is available to users during the event.

5. The system of claim 1, wherein the one or more physical processors are further configured to make the event-specific virtual currency available to the users during a second event in the online game, wherein the second event occurs subsequent to the event.

6. The system of claim 1, wherein the one or more physical processors are further configured such that the in-game benefits associated with the event-specific virtual currency are different than the in-game benefits purchasable with the first virtual currency.

7. A computer-implemented method of facilitating temporary event-specific currency to users in an online game during events, wherein the users are associated with client devices, wherein the users include a first user, wherein the first user is associated with a first client device, the method being implemented on a computer system that includes one or more physical processors and storage media storing machine-readable instructions, the method comprising:

executing an instance of the online game, and facilitate interaction of the users within the online game in response to user input received from the users through the client devices during gameplay;

transmitting game state information obtained from the instance of the online game over the network to the client devices to facilitate presentation of views of the online game to the users on the client devices;

managing a first virtual currency in the online game, wherein the first virtual currency is exchangeable for in-game benefits;

managing user accounts of the users, wherein the user accounts include inventories such that a first user account of the first user includes a first inventory, wherein the first inventory includes a first amount of the first virtual currency;

managing an event in the online game, wherein a duration of the event is temporary;

during the event in the online game that occurs concurrently with the interaction of the users, managing an event-specific virtual currency the users can earn during the event, wherein the event-specific virtual currency is exchangeable for in-game benefits during the event and not after the duration of the event, wherein the in-game benefits obtained by the users in exchange for the event-specific virtual currency persist in the online game after the event, wherein the first inventory includes, during the event, a particular amount of the event-specific virtual currency;

distributing, during the event, amounts of event-specific virtual currency to the users in the online game as a reward for one or both of certain operations performed by the users or achievements accomplished by the users in the online game, such that the particular amount of the event-specific virtual currency is distributed to the first user;

effectuating, responsive to particular user input received from the first user through the first client device, and during the event, an exchange of some or all of the particular amount of event-specific virtual currency for a particular in-game benefit, wherein, due to the exchange, the first inventory is reduced by some or all of the particular amount of event-specific virtual currency, wherein the particular in-game benefit persists in the online game after the event;

after the duration of the event, expiring the event-specific virtual currency such that the event-specific virtual currency is not available to the users and no longer exchangeable for any in-game benefits, wherein expiration of the event-specific virtual currency includes providing notifications to the client devices pertaining to the expiration of the event-specific virtual currency; and facilitating particular interaction of the first user in the online game, wherein the particular interaction involves the particular in-game benefit for the first user after the event.

8. The method of claim 7, further comprising:
facilitating exchanges of the first virtual currency in the online game by storing information associated with the first virtual currency on electronic storage media.

9. The method of claim 7, further comprising:
monitoring the instance of the online game to identify one or both of performance of the certain operations or accomplishment of the achievements in the online game.

10. The method of claim 7, further comprising:
facilitating availability of the first virtual currency to users during the event.

11. The method of claim 7, further comprising:
making the event-specific virtual currency available to the users during a second event in the online game, wherein the second event occurs subsequent to the event.

12. The method of claim 7, further comprising:
facilitating that the in-game benefits associated with the event-specific virtual currency are different than the in-game benefits purchasable with the first virtual currency.

* * * * *